Sept. 25, 1934.  H. A. DREFFEIN  1,974,413
HEAT REGULATING METHOD AND APPARATUS
Filed Oct. 1, 1931
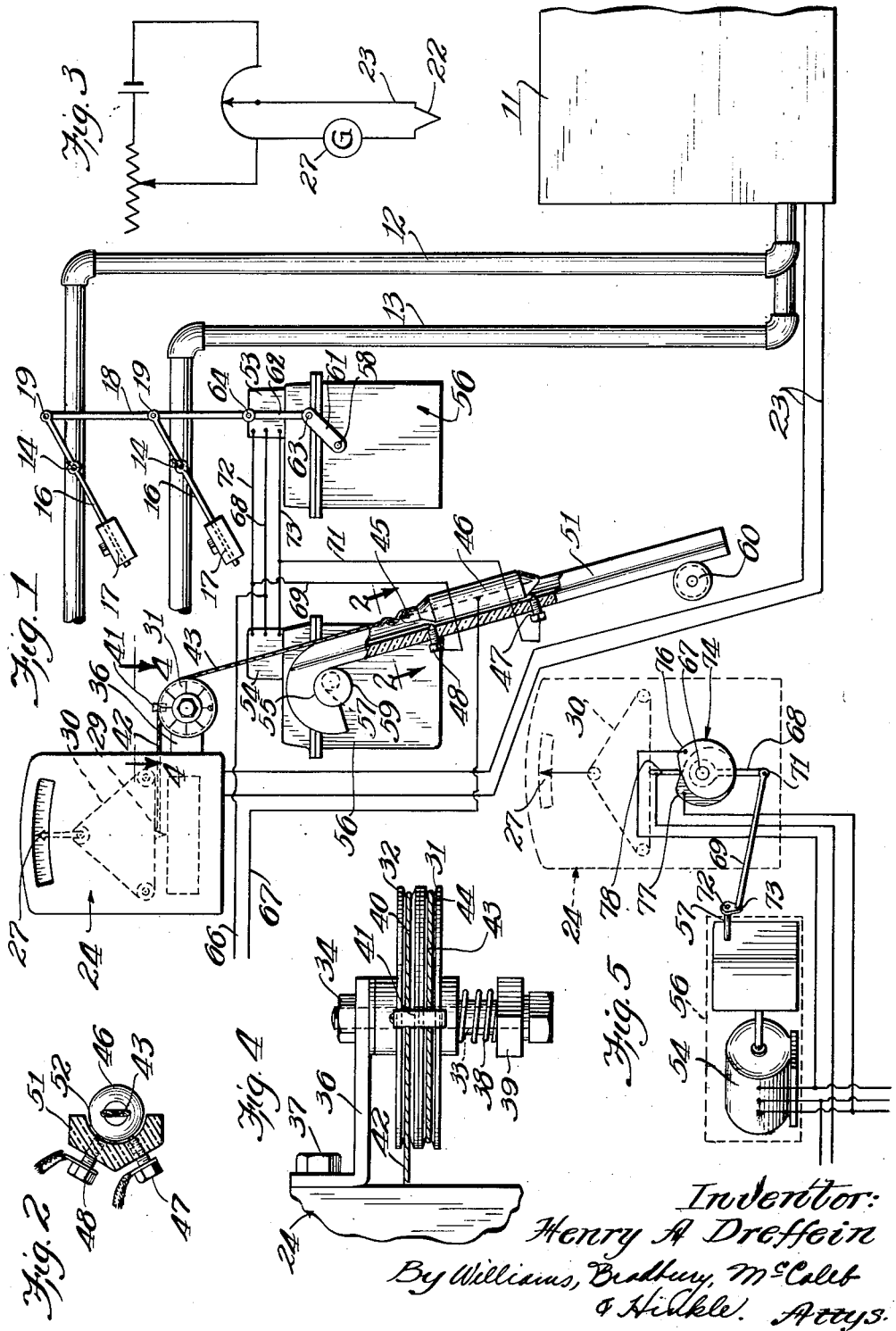
Inventor:
Henry A Dreffein
By Williams, Bradbury, McCaleb
& Hinkle. Attys.

Patented Sept. 25, 1934

1,974,413

UNITED STATES PATENT OFFICE 1,974,413

HEAT REGULATING METHOD AND APPARATUS

Henry A. Dreffein, Chicago, Ill.

Application October 1, 1931, Serial No. 566,322

3 Claims. (Cl. 236—74)

My invention relates to furnaces and more particularly to a novel method and apparatus for automatically controlling the temperature within a furnace.

My invention contemplates the provision of means for automatically regulating the temperature conditions of a furnace whereby fluctuations in temperature will be immediately counteracted by variations in rate of fuel flow to the furnace.

A further object of my invention is the provision of an electrically actuated furnace fuel control which automatically adjusts the fuel supply as the furnace temperature varies from a predetermined desired value.

Another object of my invention is to provide a novel method and apparatus for controlling the temperature within a furnace whereby the fuel supply to the furnace is increased or decreased in accordance with the difference between an actual and a desired temperature, and as the temperature within the furnace approaches the desired temperature the increases or decreases in rate of supplying fuel are cut off prior to the attainment of the desired temperature, the temperature of the point of cut-off being made to differ from the desired temperature as the actual temperature differs from the desired temperature.

Other objects and advantages of the invention will be apparent as it is better understood from the following description taken in connection with the accompanying drawing, in which:

Figure 1 is a diagrammatic view of a furnace embodying the features of my invention;

Figure 2 is a view taken on the line 2—2 of Figure 1;

Figure 3 is a schematic wiring diagram of a temperature responsive device adapted for use in connection with furnaces;

Figure 4 is a view taken on the line 4—4 of Figure 1; and

Figure 5 is a partial diagrammatic view of another embodiment of my invention.

I accomplish the foregoing objects and eliminate the difficulties of furnace regulation by manual or signal means by providing a novel method and apparatus for automatically controlling the fuel supply to a furnace. In the instant invention I provide a method whereby the rate of supplying fuel to a furnace is varied in accordance with the relationship existing between an actual and a desired temperature and these variations in rate of supplying fuel are cut off at some time prior to the attainment of the desired temperature. These changes in rate of supplying fuel are preferably made in constant increments or decrements and the temperature of the point of cut-off of variations in rate of supplying fuel to the furnace is preferably made to differ from the desired temperature by a variable amount varying in accordance with the relative difference between the actual and the desired temperatures. By providing such a novel method and apparatus for regulating and controlling the furnace temperature and the furnace fuel and/or air supply, errors due to the human factor are eliminated and the fuel and/or air is efficiently utilized so that just the proper rate of flow of fuel and/or air is maintained to obtain the desired temperature.

My novel method of furnace temperature control may be applied to a furnace 11 illustrated diagrammatically in the drawing. A supply line 12 is used to convey the fuel and/or air from a source not shown to the furnace 11. If desired two lines may be used to convey the fuel and air to the furnace, one being used for fuel in a liquid, gaseous form or any other suitable fuel in the mobile state and the other for air, in which case an auxiliary line 13 is provided. These lines are provided at any convenient location with dampers or control valves 14. These control valves are preferably operated by a mechanism which normally does not entirely close the valves. The valves 14 are attached in any convenient manner to valve operating means or arms 16 provided at one end with slidable weights 17 or means for providing the correct amount of counterbalance for a valve arm operating means or actuating rod 18, to which the arms 16 are affixed in any suitable manner. The valve arms 16 are preferably pivoted to this actuating rod as at 19.

By providing suitable means for actuating the rod 18 the position of the valve 14 may be adjusted in the line 12, or if two lines are used, in the lines 12 and 13 to obtain varying flows of fuel and/or air to the furnace. Moreover, changes in rate of flow of fuel should preferably be made responsive to temperature changes in the furnace and some means of obtaining a change in rate of flow to correspond to a desired temperature variation should be provided. Accordingly I employ a means for determining the temperature in the furnace or a temperature indicator of any suitable type such for example as a pyrometer, diagrammatically shown in the drawing at 24. A usual pyrometer employs a thermo-couple 22 located within the furnace and connected by leads 23 to the pyrometer 24. The pyrometer usually includes a thermo-couple circuit which may be similar to that illustrated schematically in Fig. 3, in which the temperature changes in the furnace produce a current potential in the thermo-couple circuit.

This unknown potential is balanced against known potentials forming a potentiometer. When the known potential has been made equal to the thermo-couple potential the circuit is balanced and the galvanometer 27 shows no deflection. An indicator or movable contact 29 moves in response to temperature changes in the furnace for automatically balancing the galvanometer and may be controlled by the galvanometer by any suitable means, for example, a pulley and belt mechanism 30. The operation of a pyrometer is well known by those skilled in the art and requires no further explanation.

In the practice of my invention I employ this pyrometer 24 to control suitable apparatus to carry out my novel method of furnace temperature control. Such a suitable apparatus is provided by employing the indicator 29 or any other temperature responsive means to control or to drive a means which will provide movements proportional to the movements of the indicator 29 and which will allow the setting of a desired temperature. This may be accomplished by providing reciprocable elements controlled from the indicator 29 which may be provided with means for setting a desired temperature by moving one reciprocable element with respect to the other or, as indicated in the drawing, movable, rotatable or oscillatable elements or pulleys 31 and 32 may be mounted on a bolt 33 provided with a nut 34 for holding the assembled elements in position and may be attached, in any convenient manner as by a bracket 36 and bolts 37, to the housing of the pyrometer 24. It is desirable, in the practice of my invention, that the pulleys 31 and 32 be adapted to be rotatable or movable together upon action of the indicator 29 or be rotatable with respect to each other to obtain a setting of a desired temperature. As means for holding the pulleys in frictional engagement, I employ a spring 38 held into engagement with the pulley 31 by a nut 39 which provides a means for adjusting the tension of the spring 38. Releasing the spring 38 by any available means provides a means for releasing the frictional engagement of the pulleys and allowing them to be rotated with respect to each other to obtain settings of temperature.

One of the pulleys 31 or 32 is provided with a graduated scale in degrees of temperature around its periphery and the other is provided with an indicator 41 so that any desired temperature may be set by rotating one of the pulleys 32 until the desired temperature point is in line with the indicator 41 affixed to the pulley 32. The pulley 32 is provided with means for establishing cooperative movement with the indicator 29, as by a rope or cable 42, one end being attached to the indicator 29 and the other end preferably given approximately one turn around a groove 40 provided on the pulley 32 and affixed thereto in any suitable manner. The pulley 31 is similarly provided with a cable 43 which fits in a groove 44 one end being attached to the pulley 32 and the other end passing through an aperture 45 formed in a contact member 46 and affixed thereto.

In the practice of my invention I employ the movement of this contact member 46 to selectively engage other contacts so that the operation of motors may be controlled which in turn control the rate of flow of fuel to the furnace. Accordingly I provide contacts 47 and 48 which are adapted to be selectively engaged by the contact 46 upon movement thereof. The contacts 47 and 48 may be mounted in any suitable manner although they are preferably carried by a member 51 which may be provided with a groove 52 in which the movable contact 46 may ride. In order to cut off the variations in rate of supplying fuel prior to the attainment of the desired temperature, I provide for movement of the member 51 so that the contacts 47 and 48 may be moved relative to the contact member 46. As shown in the drawing, the contact member 46 is in mid position between the contacts 47 and 48. It is preferable to make the contact member 46 slightly shorter than the distance between the contacts 47 and 48, this difference being made any desired amount so that some slight movement of the indicator 29 is necessary when the contact member 46 is in this mid position before any of the contacts are made.

It will be apparent that a rotation of the pulley 31 with respect to the pulley 32 in a counterclockwise direction will cause the contact 46 to engage the contact 48 while the contacts 46 and 47 will be engaged if the pulley is rotated in a clockwise direction, and further that the degree of rotation of the pulley 31 will change the point to which the contact 46 will move in engaging the contacts 47 and 48, that is, for example, a large clockwise movement of the pulley 31 will cause engagement between the contact 46 and the contact 47 at a point closer to the aperture 45 than will a smaller clockwise movement of the pulley 31. Hence rocking or rotation of the pulley 31 is reflected in corresponding movement of the contact 46 with respect to the contacts 47 and 48 and similarly, movement of the indicator 29 responding to temperature changes in the furnace is reflected in corresponding movement of the contact member 46. These contacts control the operation of motor means or motors 53 and 54. These motors or prime movers 53 and 54 may be of any suitable type adapted to govern the fuel control valve 14, but are preferably of the reversible type, and although they may be arranged to operate directly it is usually preferable to utilize some method of speed reduction. They may be connected in any convenient manner, although as indicated in the drawing they are wired in parallel. One of the motors, as for example motor 54, may be arranged to contribute to the controlling of the motors by means to be hereinafter described.

Units comprising a suitable motor and suitable speed reduction means are available and their operation requires little explanation as they are familiar to those skilled in the art to which this invention pertains. A casing 56 houses speed reduction gears, arranged so that the motors 53 and 54 will drive these gears and a reduction in speed of the motor will be available at the output shaft of the gears as for example the shafts 57 and 58. This speed reduction is preferably of such order that standard speed motors may be used and the output shaft speeds of the worm gears will be of such speed as to conveniently operate the mechanism with which they are associated.

The member 51 guidingly supporting the contacts 47 and 48 is arranged for movement by the shaft 57. This may be accomplished in any suitable manner to provide movement of the member 51 so as to provide movement of the contacts 47 and 48. This movement of the contacts 47 and 48 cooperating with the contact member 46 provides a means for stopping the variations in rate of supplying fuel to the furnace. However, it is desirable that the movement of the contacts 47 and 48 be such that the temperature at which the variations in the rate of supplying fuel is stopped differ from the desired temperature in varying amounts, and it is preferable that the temperature of this point of cut off in relationship to the desired temperature should vary as the difference between an actual and a desired temperature varies. To accomplish this the shaft 57 may be fitted with a means for providing a reciprocating movement to the member 51 and is accordingly fitted with an eccentric or a cam 59. The cam 59 may be of any shape adapted to transmit a reciprocating motion to the member 51 which may be provided with a curved or arcuate portion as at 55 adapted to hook over or engage the cam 59. Moreover the member 51 may be placed in any position although it is preferable that it be placed in a position approaching the vertical and supported by a roller 60.

The output shaft 58 of the reversible motor 53 is provided with means for opening and closing the fuel and/or air control valves 14 and is accordingly connected to the rod 18 as by a connecting linkage including a crank 61 suitably attached to the shaft 58. A connecting member 62 may be pivoted to the crank 61 as at 63 and is preferably pivoted to the rod 18 as at 64. It will be apparent that rotation of the motor 53 will operate the control valve 14. If desired the motor 54 may be eliminated and the cam 59 mounted on the output shaft of the motor 53 at the crank 61 for stopping the motor 53 at the desired point.

As has been mentioned, the motors 53 and 54 are preferably connected in parallel, as by conductors 66 and 67 which are connected to a suitable source of energy. The conductor 66 passes to a lead 68 which is common to both motors and the conductor 67 is connected to the contact member 46. Leads 69 and 71 connect the contacts 47 and 48 to leads 72 and 73 which are common to both motors. The motors 53 and 54 may operate at different speeds and the shafts 57 and 58 may operate at different speeds, although it is usually preferably that they operate at approximately the same speed for by such operation the rotation of the cam 59 will cause cut-off of the variation rate of supplying fuel to take place at the desired point. When the pulley 31 is rotated with respect to the pulley 32 the setting of a desired temperature is obtained thereby and the contact member 46 moves in one direction or the other for example upwards, causing the contact 46 to engage the contact 48 thereby rotating the motors 53 and 54. The difference between the actual furnace temperature and the desired temperature will determine the amount of rotation of the pulley 31 necessary and hence the point at which the contact 46 will be engaged by the contact 48.

When the contacts 46 and 48 are engaged the motors rotate and the length of time of rotation of these motors is determined by the amount of rotation of the pulley 31; and the motor 53 causes the valve 14 to operate, while the motor 54 operates the cam 59 to cause movement of the member 51 upwardly. Thus more fuel is admitted to the furnace and the temperature gradually rises, the increase being indicated in the movement of the indicator, in this case to the right.

As the indicator 29 moves to the right the pulleys 31 and 32, which are now in frictional engagement, will be rotated in a clockwise direction and as the temperature rises toward the desired point the contact member 46 will be moving downwardly tending to break the engagement of the contacts 46 and 48. The rotation of the cam 59 is however reciprocating the member 51 tending to break the engagement between the contacts 46 and 48 due to the fact that the member 51 is moving upwardly or in a direction opposite to that of the contact member 46. Thus the contacts 46 and 48 are moving relative to each other and in a direction opposite to each other, and this upward movement of the contact 48 causes the engagement between the contacts 46 and 48 to be broken prematurely or before it can be broken by the downward movement of the contact 46, thus arresting the further increase of flow of fuel to the furnace as the motors are stopped by this action. Hence it will be apparent that the point of cut-off of increase in fuel supply is determined by the relative movement of the contacts 46 and 48, and the cam 59 may be arranged to cut off the increase in fuel supply at such a point as to prevent overriding of the desired temperature. In a furnace temperature control apparatus it is usually desirable that the apparatus be arranged to control the temperature within very close limits of the temperature for which the furnace has been set so that if for any reason the temperature within the furnace should change the control apparatus will immediately function to restore the desired temperature.

For example, if the temperature in the furnace should rise slightly above the desired point the indicator 29 will move to the right. As the indicator moves to the right the pulleys 31 and 32, held frictionally, will be rotated in a clockwise direction. As the pulleys are rotated the contact member 46 is moving downward so that the contact member 46 engages the contact 47 thereby starting both motors 53 and 54.

As soon as the contacts 46 and 47 come into engagement the motor 54 starts moving the contact 47 downwardly so that the contacts 46 and 47 may be moving in the same direction. The rotation of the motor 54 is tending to close the control valve 14, tending to arrest any further increases in furnace temperature and at some point the downward movement of the contact 46 may be arrested and may start moving upwardly. Because of this relative movement between the contacts 46 and 47 their engagement is broken before the temperature in the furnace reaches the temperature for which the apparatus has been set, and thus the tendency for the control valve to be closed too much, so as to provide less than the proper amount of fuel, is eliminated. It will be observed that constant and close regulation of the temperature of the furnace at the point for which the apparatus has been set is obtained.

It is evident that the apparatus, by which my novel method of furnace temperature control is carried out, may be varied as shown in Fig. 5. Two motors may be used as before, preferably of the reversible type and preferably wired in parallel. One of the motors may be utilized to control the fuel and/or supply valves 14 and the other to operate a setting dial graduated in degrees located preferably in the pyrometer. Accordingly the setting dial is mounted on a shaft 67, operatively connected by means of suitable linkage to the motor 54. The linkage may comprise an arm affixed to the shaft 67 and a connecting link 69 pivoted to the arm 68 as at 71. The connecting link may be pivoted to a crank 72 as at 73 secured to the output shaft 57 of the reduction unit 56.

On the shaft 67 there may be also mounted a suitable switch or commutator 74 which may include two conducting cam shaped segments 76 and 77. A brush or contact 78 may be arranged to operate responsive to movements of the galvanometer as by mounting the brush 78 on the belt 30 and may be arranged so that it will make contact with the contacts 76 and 77 upon rotation of the commutator 74.

It will be apparent that the motor 53 will, as before control the fuel and/or air valves 14, and that the motor 54 through the contacts 76, 77 and 78 will control the length of time of operation of both motors, as the degree of rotation of the setting dial will determine the point at which the contact 78 makes contact with the contacts 76 or 77, while the direction of rotation of the motors 53 and 54 will be determined by which of the contacts 76 and 77 is engaged by the contact 78. The point of cutoff of increases or decreases in rate of fuel and/or air supply may be varied to secure cut-off at the required point to prevent overriding the desired temperature. This may be accomplished by rotating the setting dial through an arc less than that required to set the desired temperature, so that the motors 53 and 54 may be stopped before the desired temperature is reached.

It will be apparent that I have provided apparatus extremely sensitive to temperature variations and apparatus which will immediately function to vary the supply of fuel and/or air whenever the temperature of the furnace varies from the temperature for which it has been set.

It will further be evident that I have provided a novel method and apparatus for controlling the temperature of a furnace whereby the rate of supplying fuel to a furnace is varied in accordance with the relative difference between an actual and a desired temperature and that the variations in rate of supplying fuel are cut off at some temperature point prior to the attainment of the desired temperature, and that the difference between the temperature of the point of cutoff and the desired temperature has been made to vary in accordance with the relative difference between the actual and the desired temperature.

While I have illustrated and described a specific embodiment of my invention, many modifications may be made without departing from the spirit of the invention, and I do not wish to be limited to the precise details set forth, but desire to avail myself of all change within the scope of the appended claims.

What I claim is:

1. In a furnace a pair of simultaneously operable reversible motors, a fuel control valve operable by a said motor, cam means controlled by the other said motor for stopping the first said motor, associated pulleys rotatable in response to furnace temperatures, and switch means operable by said pulleys for starting said motors.

2. In a motor operated furnace fuel control apparatus, a fuel control valve, a pair of reversible motors, a reversible motor being operatively connected to said control valve, associated selective and reciprocable contact means controlling said reversible motors, and manual means for adjusting said selective contact means relative to said reciprocable contact means in starting said motors, the other said reversible motor having an eccentric operatively connected to said reciprocable contact means to adjust said reciprocable contact means relative to said selective contact means in stopping said motors.

3. In an electrical furnace control apparatus, a pyrometer operable responsive to temperatures in said furnace, a control switch having selective points of contact, means responsive to variations in the indication of said pyrometer for actuation of said switch including a rotatable indicator dial for operating said control switch, a pair of motors controlled by said switch, one of said motors controlling the fuel supply to said furnace and the other cooperating with said rotatable indicator dial in controlling the operation of said switch and said first mentioned motor.

HENRY A. DREFFEIN.